Patented Oct. 3, 1922.

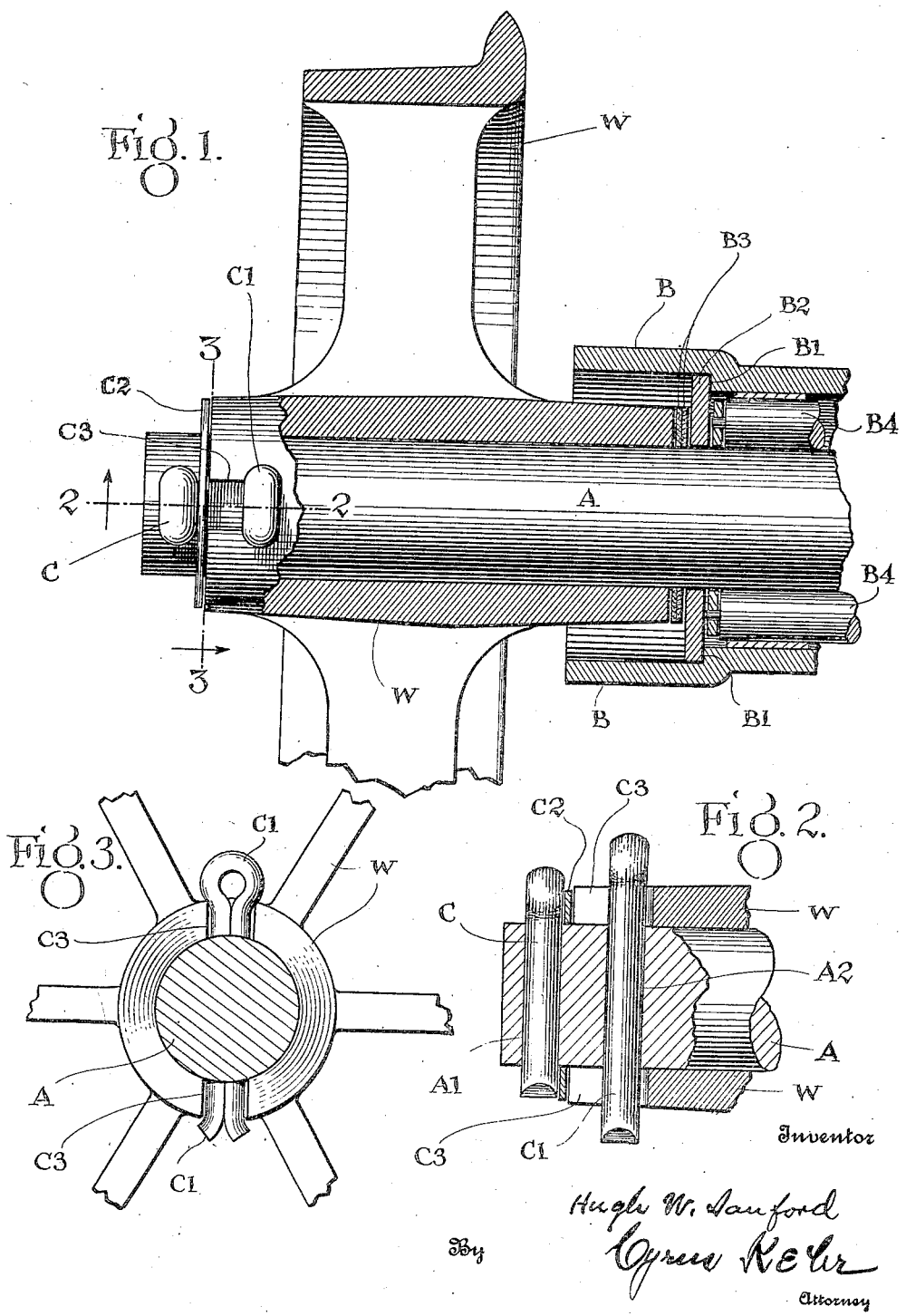

1,430,593

UNITED STATES PATENT OFFICE.

HUGH W. SANFORD, OF KNOXVILLE, TENNESSEE.

WHEEL AND AXLE.

Application filed January 20, 1922. Serial No. 530,630.

*To all whom it may concern:*

Be it known that I, HUGH W. SANFORD, a citizen of the United States, residing at Knoxville, in the county of Knox and State of Tennessee, have invented a new and useful Improvement in Wheels and Axles, of which the following is a specification, reference being had to the accompanying drawing.

My improvement relates particularly to such wheels and axles as are made parts of mine cars and similar cars used for hauling relatively small loads, and my improvement is applicable particularly to wheels and axles which are associated with bearings surrounding the axle beside the wheels, whereby the axles are made rotatable.

In such structures it is at times desirable to have one of the wheels free to turn ("loose") on the axle, while the other wheel is held against rotation ("tight") on the axle, in order that either wheel may be free to make rolling contact with its rail independently of the turning of the other wheel; in other words, that the two wheels may not be compelled to rotate in exact unison. This provision is important on tracks which have curves; for on such curves the wheel on the outer rail of the track must turn faster than the other wheel, if both wheels are to make maintained rolling contact without slipping on the rails.

The object of my invention is to provide an efficient and economical structure whereby such wheels may be readily made "loose" or "tight," as may be deemed desirable by the attendant.

In the accompanying drawings,

Fig. 1 is a horizontal section showing a wheel and an axle and a bearing box for the axle, the section being along the axial line and parts being uncut;

Fig. 2 is an upright section on the line, 2—2, of Fig. 1, looking in the direction of the arrow;

Fig. 3 is an upright section on the line, 3—3, of Fig. 1, looking toward the right.

Referring to said drawings, A is one end of an axle, which it is understood is prolonged to full length toward the right. Said axle rests in a bearing, B, in which are bearing rollers, $B^4$, which make contact with the axle.

The bearing, B, has an annular shoulder, $B^1$, directed toward the left. A washer, $B^2$, surrounds the axle, A, and rests against said shoulder. At the left of said washer are two other washers, $B^3$, which bear against each other and one of which bears against the washer, $B^2$, while the other makes contact with the hub of the wheel, W, which loosely surrounds the axle, A, at the left of the bearing; that is to say, said wheel is free to turn on said axle, excepting when held against such turning by the means to be hereinafter described.

It will be observed that the shoulder, $B^1$, holds the washer, $B^2$, against the rightward movement, and that said washer holds the washer, $B^3$, against rightward movement and that the washers, $B^3$, constitute a means for holding the wheel, W, from moving rightward. Indirectly, that is, through the washers, $B^2$ and $B^3$, the annular shoulder, $B^1$, constitutes an abutment for holding the wheel, W, against rightward movement.

Immediately at the left of the wheel, W, the axle is surrounded by a washer, $C^2$. Immediately at the left of said washer, an aperture, $A^1$, extends transversely through the axle, A. A cross-member, shown by the drawings as a cotter pin, C, extends through said aperture and serves to hold the washer, $C^2$, against leftward movement. Said washer holds the wheel against leftward movement. Indirectly, through the washer, $C^2$, the cotter pin, C, forms an abutment for holding the wheel against leftward movement.

At a short distance rightward of the washer, $C^2$, an aperture, $A^2$, extends transversely through the axle, A. Opposite each end of said aperture, an aperture, $C^3$, is formed in the hub of the wheel, W. A cross-member, shown by the drawings as a cotter pin, $C^1$, extends through said apertures, $C^3$, and the aperture, $A^2$, of the axle. The apertures, $C^3$, may be of any desired form which will permit the insertion and removal of the cotter pin, $C^1$. In the drawings, said apertures are shown as being elongated to form slots parallel to the length of the axle and as extending through the end of the hub to the washer, $C^2$, and extending rightward far enough to avoid contact between the hub and the cotter pin, $C^1$, so that the cotter pin is not concerned with holding the wheel against movement parallel to the axle in either direction, such movement being prevented by the abutment shoulder, B¹, and the abutment cross-member, C.

It is now to be observed that the axle, A, is at all times free to turn in the bearing, B.

It will also now be seen that when the cotter pin, C¹, is in position in the apertures, A² and C³, as shown by the drawings, the wheel, W, is held against rotation on the axle, A, and said axle is held against rotation within the wheel. Hence when the wheel makes rolling contact with the rail, the axle must turn with the wheel; and if, through action of the companion wheel, the axle, A, is turned faster or slower than required or permitted by rolling contact of the wheel, W, with its rail, said wheel must slip, either forward or backward, on its rail. In other words, when the cotter pin, C¹, is in position, as shown in the drawings, the wheel, W, is "tight" on the axle, A.

It will also be seen that when the cross-member or the cotter pin, C¹, has been removed from its position in the apertures, A² and C³, the wheel, W, and the axle, A, are free for relative rotation, the wheel being free to make rolling contact on its rail regardless of rotation or non-rotation of the axle, and the axle being free to rotate in the wheel, regardless of the movement of the latter on its rail.

With this provision at each end of the axle for making the wheel "loose" or "tight," the attendant can remove or set the wheel-locking cotter pin C¹, at either wheel and make the reverse arrangement at the other wheel. Then the two wheels are adapted to turn independently of each other and to maintain complete rolling contact with their respective rails, regardless of track curves.

My improvement does not prevent the operating of the car with both wheels fast or both wheels loose on the axle, as may be deemed desirable.

The work required for embodying my improvement in a structure comprising an ordinary mine car wheel axle and bearings and wheels consists in boring the aperture, A², through the axle, forming the two oblong apertures or slots, C³, in the end of the hub, by casting or cutting, and forming the cotter pin, C¹.

I claim as my invention:

1. In a car structure of the kind described, the combination of a bearing, an axle having near its end two transverse apertures, a wheel having in its hub two apertures adapted to come into alignment with the inner of said axle apertures, a cross member for one of said axle apertures, and another cross member for the other of said apertures and the apertures of the wheel hub, substantially as described.

2. In a car structure of the kind described, the combination of a bearing, an axle having near its end two transverse apertures, a wheel having in its hub two slots adapted to come into alignment with the inner of said axle apertures, a cross member for one of said axle apertures, and another cross member for the other of said apertures and the slots of the wheel hub, substantially as described.

3. In a car structure of the kind described, the combination of a bearing, an axle having near its end two transverse apertures, a wheel having in its hub two apertures adapted to come into alignment with the inner of said axle apertures, a cotter pin for one of said axle apertures, and another cotter pin for the other of said apertures and the apertures of the wheel hub, substantially as described.

4. In a car structure of the kind described, the combination of a bearing, an axle having near its end two transverse apertures, a wheel having in its hub two apertures adapted to come into alignment with the inner of said axle apertures, a cross member for one of said axle apertures, another cross member for the other of said apertures and the apertures of the wheel hub, and a washer surrounding the axles between the wheel hub and the outer cross member, substantially as described.

5. In a car structure of the kind described, the combination of a bearing having an abutment, an axle having near its end two transverse apertures, a wheel having in its hub two apertures adapted to come into alignment with the inner of said axle apertures, a cross member for one of said axle apertures, and another cross member for the other of said apertures and the apertures of the wheel hub, substantially as described.

6. In a car structure of the kind described, the combination of a bearing having an abutment, an axle having near its end two transverse apertures, a wheel having in its hub two slots adapted to come into alignment with the inner of said axle apertures, a cross member for one of said axle apertures, and another cross member for the other of said apertures and the slots of the wheel hub, substantially as described.

7. In a car structure of the kind described, the combination of a bearing having an abutment, an axle having near its end two transverse apertures, a wheel having in its hub two apertures adapted to come into alignment with the inner of said axle apertures, a cotter pin for one of said axle apertures, and another cotter pin for the other of said apertures and the apertures of the wheel hub, substantially as described.

8. In a car structure of the kind described, the combination of a bearing having an abutment, an axle having near its end two transverse apertures, a wheel having in its hub two apertures adapted to come into alignment with the inner of said axle apertures, a cross member for one of said axle apertures, another cross member for the other of said apertures and the apertures of the wheel hub, and a washer surrounding the axle between the wheel hub and the outer cross member, substantially as described.

9. In a car structure of the kind described, the combination of a bearing, an axle, a wheel having a hub, the axle and the hub being apertured to receive a cross member, a cross member, and means engaging the axle adjacent the end of the hub and forming an abutment for the end of the hub, substantially as described.

10. In a car structure of the kind described, the combination of a bearing, an axle having near its end a transverse aperture, a wheel having in its hub two transverse apertures adapted to come into alignment with the aperture in the axle, a cross member adapted to be seated in said apertures, and means engaging the axle adjacent the end of the hub and forming an abutment for the end of the hub, substantially as described.

In testimony whereof I have signed my name, this sixth day of January, in the year one thousand nine hundred and twenty-two.

HUGH W. SANFORD.